July 30, 1946.   I. ROSENBLOOM   2,405,056
SAFETY GRATER
Filed Dec. 31, 1941
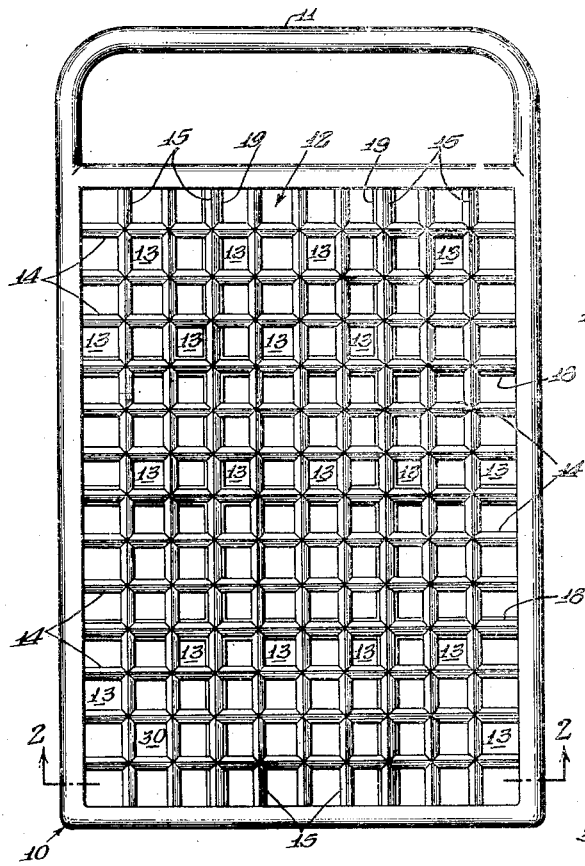
FIG. 1.
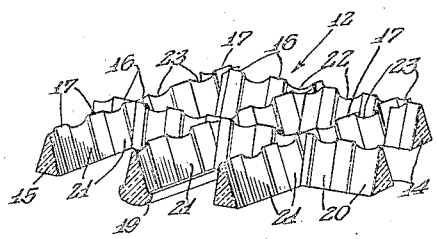
FIG. 3.
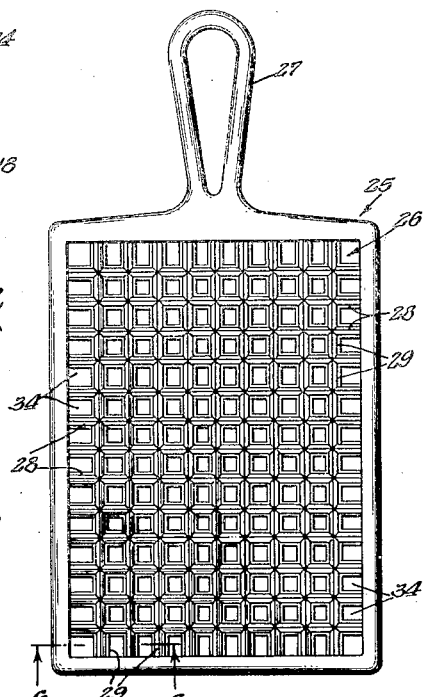
FIG. 5.
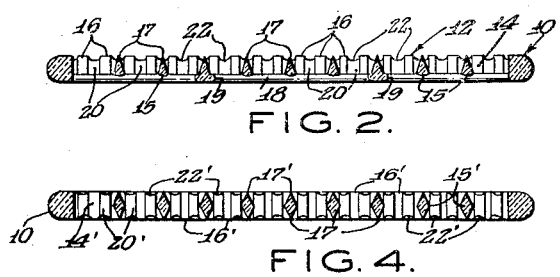
FIG. 2.
FIG. 4.
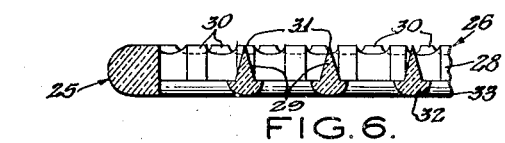
FIG. 6.
INVENTOR.
Irving Rosenbloom
by R. Marser
his attorney Patented July 30, 1946

2,405,056

UNITED STATES PATENT OFFICE 2,405,056

SAFETY GRATER

Irving Rosenbloom, New York, N. Y., assignor to Renwal Manufacturing Co., Inc., New York, N. Y., a corporation of New York Application December 31, 1941, Serial No. 425,073

10 Claims. (Cl. 146—177)

This invention relates to improvements in graters, and more particularly to a novel, practical, plastic grater.

It is among the objects of the present invention to provide a grater suitable for all grating purposes, and which is always safe to use. In accordance with my invention I provide a unitary grater construction of composition or plastic material. The unitary grater avoids the use of metal or of sharp metallic edges that have characterized prior graters. The resultant grater is rust-proof, effective, and cannot cause injury to the user.

The plastic grater of my present invention is a sturdy, durable utensil, useful for grating foods, vegetables, soaps, breads, and the like. It is also useful for dicing cooked vegetables and other foodstuffs. My preferred unitary grater construction permits ready cleansing, insuring a sanitary utensil, so essential when used with food. Also, the plastic grater is practical, and relatively inexpensive to fabricate.

These and further objects, advantages and capabilities of my invention will become more apparent in the following description of preferred embodiments thereof, illustrated in the drawing, in which:

Fig. 1 is a plan view of one construction of the unitary grater.

Fig. 2 is a cross-sectional view through the grater of Fig. 1, taken along the line 2—2 thereof.

Fig. 3 is an enlarged perspective view of a detail of the grater of Fig. 1.

Fig. 4 is a cross-sectional view, corresponding to Fig. 2, of a modified form for the grater.

Fig. 5 is a plan view of another form of the grater.

Fig. 6 is an enlarged cross-sectional view of the grater of Fig. 5, taken along the line 6—6 thereof.

The construction of the plastic grater of the invention is preferably such as to permit its complete fabrication by a single mechanical molding operation. The plastic material may be of any suitable type, including phenolic resins, such as Bakelite and Catalin; cellulose acetate; acrylic resins, such as Lucite; styrene resins; or other plastic molding composition. The grater may be formed by injection molding, compression molding, or by casting. The preferred plastic grater is a unitary device. Towards this end the invention provides a unitary plastic grater of ample strength and durability, incorporating suitable molded grating surfaces. I have constructed complete practical commercial graters, in accordance with the present invention, by a single injection or compression molding operation. The result is a unitary grater of pleasant appearance, durable, sturdy, efficient, stainless, sanitary and relatively inexpensive.

Figs. 1, 2 and 3 illustrate one exemplification which the unitary plastic grater may assume in practice. The grater comprises a rectangular frame 10 having an extended looped handle 11. A lattice network 12 is integrally formed with framework 10. The lattice network 12 contains a plurality of symmetrically arranged square, or rectangular, openings 13 formed by a series of regularly spaced horizontal bars 14 and vertical bars 15. Bars 14 and 15 are in the same plane, and are molded to constitute a unitary lattice network construction incorporating the openings 13. The frame 10 and lattice network 12 are molded as a single unitary structure, with the ends of bars 14 and 15 integrally terminating in frame 10.

The grating surface of lattice network 12 is formed by shaping bars 14 and 15 thereof so as to taper into cutting edges 16 and 17. The cross-sectional appearance of bars 14 and 15 are accordingly triangular as seen in Figs. 2 and 3. In this manner sufficient mechanical strength is imparted to bars 14 and 15 comprising the lattice network 12, and also insures suitable cutting edges for the grating surface thereof. Additional mechanical strength may be imparted to the lattice network 12 without interfering with the grating or dicing operations of the grater. Towards this end I provide ribs or bulges 18 and 19 on the non-cutting sides of bars 14 and 15 respectively. Strengthening ribs 18 and 19 have a cross-sectional width slightly larger than that of the non-ribbed bars. Such ribs may be provided for selected bars so as not to interfere with the size of diced elements. In the grater embodiment of Fig. 1, ribs 18 and 19 are provided respectively for three symmetrically spaced horizontal bars 14, and two vertical bars 15. It is to be understood that more or less of the bars may be so reinforced within the scope of the invention.

The thickness of the bars containing the strengthening ribs preferably does not exceed the thickness of the frame 10, as shown in Fig. 2. The grating surface is preferably arranged in a plane corresponding with a surface of frame 10, so that the frame will not interfere with the grating action. In this manner, for a given thickness of frame 10, for example $\frac{3}{16}''$, a plastic lattice network 12 of ample mechanical strength may be provided for the grater. The tapered nature of the lattice bars 14 and 15 insures durable grating edges that will stand up under all conditions of use. The strengthening ribs do not affect the dicing operation of the grater, since the resulting openings 13 in the grater are not unduly interfered with. In one form, the strengthening ribs corresponding to 18 and 19 may be provided for all the horizontal and vertical lattice bars, as will be shown in connection with the form of the invention illustrated in Figs. 5 and 6.

An important feature of the present invention is the novel grating surface arrangement provided for the plastic lattice network. The grating or cutting surface is arranged substantially in a single plane, preferably co-extensive with the corresponding edge of the supporting frame 10. Also, the design of the grating surface is such as to permit its direct molding with the remainder of the grater as a unitary body. Fig. 3 clearly illustrates the preferred nature of the grating edges. The lattice bars 14 and 15 taper to narrow or pointed edges 16 and 17 respectively. By providing regular constrictions or spaced narrowed widths 20, 21 along lattice bars 14 and 15, the resultant formations terminate as grating edges 22, 23, alternated with grating edges 16 and 17 respectively. In this manner two sets of interlaced cutting edges 16, 17 and 22, 23 are formed on the grating surface of the lattice network 12, which sets are in planes substantially close together. The displaced cutting edges constitute sharp saw-tooth cutting surfaces along lattice bars 14, 15. Such arrangement permits the direct molding of practical grating teeth for the plastic grater, which arrangement has been found very satisfactory in practice both from the molding and use standpoints. It is to be understood however, that other serrated or cutting edge constructions for the plastic grating surface may also be utilized.

Fig. 4 illustrates a modified form of the grater, wherein both sides thereof constitute grating surfaces. A transverse series of bars 14' and 15' are arranged similarly to bars 14 and 15 of Fig. 1. The bars 14' and 15' taper toward both outer surfaces of the grater. The cross-sectional appearance of the bars is diamond shaped, as shown at 15' in Fig. 4. Serrated grating edges 16' and 22' extend on both sides of bars 14'; the grating edges 17' (and 23', not shown), on both sides of bars 15'. The grating edges on each side of the grater correspond to those in the form of the invention in Fig. 1, and are integrally formed during the molding operation. The cross-sectional area of the bars 14' and 15' are made sufficient to impart suitable mechanical strength to the grater. The upper and lower grating surface planes are preferably substantially co-extensive with the corresponding surfaces of the frame 10, as shown in Fig. 4.

Fig. 5 is a plan view of a further form which my invention may assume in practice. A rectangular frame 25 encloses a lattice network 26. A handle 27 extends from frame 25, and is integrally molded therewith. The lattice network 26 comprises horizontal bars 28 and vertical bars 29 containing corresponding serrated grating edges 30 and 31 respectively, similar to the previous forms of the invention. As shown in Fig. 6, all the bars 28 and 29 contain ribbed reinforcements 32 and 33 respectively, on the back sides thereof. This arrangement imparts superior mechanical strength to the lattice structure of the grater. The openings 34 in the lattice network 26 are accordingly somewhat smaller than the corresponding openings 13 of the form in Fig. 1. This merely reduces the cross-sectional area of the elements diced by the grater.

While I have disclosed preferred embodiments which my invention may assume in practice, it is to be understood that modifications and variations thereof may be made without departing from the broader spirit and scope of the invention as expressed in the appended claims.

What I claim, and desire to secure by United States Letters Patents, is:

1. A grater of plastic composition comprising a frame supporting a lattice network composed of intersecting series of parallel bars integrally molded with said frame, said bars being substantially triangular in section and terminating in grating edges lying in a common surface substantially including one face of said frame.

2. A grater of plastic composition comprising a frame supporting a lattice network composed of transverse series of parallel bars in substantially the same plane integrally molded with said frame, said bars being triangular in section and terminating in grating edges lying in a plane substantially including one face of said frame, said triangular bars extending in height to substantially the other face of said frame.

3. A grater comprising a frame, a lattice network composed of transverse series of bars of plastic material integrally molded with said frame, said bars terminating in grating edges lying in a surface substantially including one face of said frame, a plurality of said bars having reinforcing ridges extending oppositely of said grating edges and merging with said frame.

4. A grater of plastic composition comprising a frame supporting a lattice network composed of transverse series of parallel bars in substantially the same plane integrally molded with said frame, said bars being triangular in section and terminating in grating edges, said bars having reinforcing ridges extending from the bases thereof and merging with said frame.

5. A grater comprising a frame supporting a lattice network composed of transverse series of bars, said bars being substantially triangular in section and terminating in sharp grating edges, said bars having regularly spaced constrictions extending to said edges to constitute a serrated grating surface.

6. A grater of plastic composition comprising a frame supporting a lattice network composed of transverse series of parallel bars integrally molded with said frame, said bars being triangular in section and terminating in grating edges, said bars having regularly spaced constrictions extending to said edges to constitute a serrated grating surface.

7. A grater comprising a frame, a lattice network composed of transverse series of bars in substantially the same plane and made of plastic material integrally molded with said frame, said bars terminating in grating edges lying in a plane substantially including one side of said frame, said triangular bars extending in height to substantially the other side of said frame, and said bars having regularly spaced constrictions extending to said edges to constitute a serrated grating surface.

8. A grater of plastic composition comprising a frame, a lattice network composed of transverse series of parallel bars in substantially the same plane integrally molded with said frame, said bars being diamond in section and terminating in sharp grating edges on both sides of the network, said grating edges lying in planes substantially including the opposite faces of said frame.

9. A grater comprising a frame supporting a lattice network composed of transverse series of parallel bars in substantially the same plane, said bars being diamond in section terminating in sharp grating edges on both sides of the network, and said bars having regularly spaced constrictions extending to said edges to constitute serrated grating surfaces.

10. A grater of plastic composition comprising a frame, a lattice network composed of transverse series of parallel bars in substantially the same plane integrally molded with said frame, said bars being diamond in section and terminating in sharp grating edges on both sides of the network, said grating edges lying in planes substantially including the opposite sides of said frame, and said bars having regularly spaced constrictions extending to said edges to constitute serrated grating surfaces.

IRVING ROSENBLOOM.